United States Patent [19]

Tago

[11] 4,327,990
[45] May 4, 1982

[54] ELECTRONIC PRINTING APPARATUS

[75] Inventor: Yoshiaki Tago, Yokohama, Japan

[73] Assignee: Tokyo Shibaura Denki Kabushiki Kaisha, Kawasaki, Japan

[21] Appl. No.: 114,352

[22] Filed: Jan. 22, 1980

[30] Foreign Application Priority Data

Feb. 2, 1979 [JP] Japan .................................. 54/11277

[51] Int. Cl.³ ............................................ G03G 15/00
[52] U.S. Cl. .................. 355/3 R; 355/14 R; 355/14 E; 355/67
[58] Field of Search .................. 355/3 R, 14 R, 14 D, 355/14 E, 67

[56] References Cited

U.S. PATENT DOCUMENTS

| 3,659,936 | 5/1972 | Klose et al. | 355/3 R |
| 4,236,809 | 12/1980 | Kermisch | 355/3 R X |
| 4,251,152 | 2/1981 | Miyakawa et al. | 355/3 R |
| 4,257,701 | 3/1981 | Hirayama et al. | 355/3 R X |

*Primary Examiner*—Fred L. Braun
*Attorney, Agent, or Firm*—Cushman, Darby & Cushman

[57] ABSTRACT

An electronic printing apparatus including a single laser oscillator providing a laser beam reflected by a rocking mirror to selectively scan a manuscript for reading or a photoconductive drum for writing. When writing the laser beam is modulated by a binary signal corresponding to the intensity of light reflected from the manuscript during reading.

8 Claims, 2 Drawing Figures

ELECTRONIC PRINTING APPARATUS

BACKGROUND OF THE INVENTION

This invention relates to an electronic printing apparatus capable of scanning a manuscript with a laser beam and reproducing the contents of the manuscript on copying paper.

Recently electronic printing apparatuses have been developed which scan the surface of a manuscript with a laser beam and reproduce the contents or copy image of the manuscript on copying paper, for use as output printers of computers or documents storage/reference apparatuses, for example. The apparatuses of this type are expected to enjoy further increased demand in the future due to various advantages such as capability of high-speed processing, reduced noise, simple mechanism, ease of enlargement or reduction of copy image, transmissibility to external systems, etc.

In one such prior art electronic printing apparatus, the main body of the apparatus contains two laser scanning systems; a reading laser scanning system oscillating a laser beam and changing it into scanning beam for the scanning of a manuscript, and a writing laser scanning system emitting a laser beam modulated by reflected light from the manuscript and exposing a photoconductive material. Thus, the use of the two expensive laser scanning systems cannot help boosting the total cost of the apparatus, thereby retarding the spread of the electronic printing apparatuses of this type.

SUMMARY OF THE INVENTION

Accordingly, the object of this invention is to provide an electronic copying apparatus capable of both reading from a manuscript and writing in a photoconductive material by the use of only a single laser scanning system, thereby reducing system cost compared with known copying apparatus using two laser scanning systems.

DETAILED DESCRIPTION OF THE PREFERRED EMBODIMENT

Now there will be described an electronic printing apparatus according to an embodiment of this invention with reference to the accompanying drawings.

Figure 1:
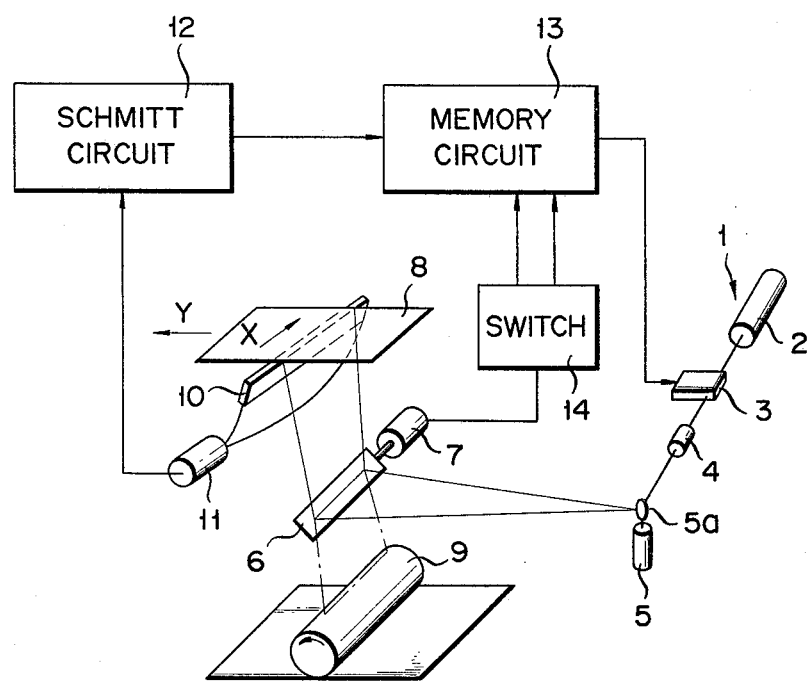
FIG. 1 is a schematic perspective view of an electronic printing apparatus according to an embodiment of this invention.

In FIG. 1, numeral 1 designates a laser scanning system which comprises a laser oscillation tube 2, and a modulator 3, an optical system 4 constructed by various lenses to converge an incident laser beam, and an optical scanner 5 that are successively arranged on the optical path of a laser beam emitted from the oscillation tube 2. The laser oscillation tube 2 may be preferably formed of an argon gas laser light source so as to be able to copy a red manuscript in addition to the other colors copied by known apparatus, and it may alternatively be formed of any other conventional device such as helium gas laser or semiconductor laser. The modulator 3 may be formed of e.g. an acoustic optical modulator which so modulates the incident laser beam as to be selectively incident into the optical system 4 by on-off signals. The optical system 4 may be formed of a group of converging lenses which converge the incident laser beam on the surfaces of a manuscript 8 and a photoconductive drum 9 as mentioned later. Further, the optical scanner 5 may be formed of a galvano-mirror including a rotating mirror 5a which reflects the incident laser light so as to change it into a linear scanning beam. On the forward side of the laser scanning system 1 lies a rocking mirror 6 rockable about a horizontal axis. The rockable mirror 6 has a rectangular shape extending in the horizontal direction, and is rocked by a driving mechanism or rotary solenoid 7. The manuscript 8 and photoconductive drum 9 are disposed above and below the rocking mirror 6, respectively, so that their respective scanning surfaces are at equal distances from the specular surface of the rocking mirror 6. When the linear scanner laser beam from the optical scanner 5 is incident on the rocking mirror 6 to be reflected therefrom, the reflected laser beam will scan the surface of the manuscript 8 if the rocking mirror 6 is in an obliquely upward position (reading position). On the other hand, if the rocking mirror 6 is in an obliquely downward position (writing position), the reflected laser beam will scan the photosensitive surface of the drum 9. The manuscript 8 is so horizontally disposed as to be able to move in a direction at right angles to the longitudinal direction of the rocking mirror 6 (that is, in Y-direction if the longitudinal direction of the rocking mirror 6 is defined as X-direction). Under the manuscript 8 lie light sensors 10 (actually two in number although only one is shown in FIG. 1) which receive reflected light from the manuscript 8. The light sensors 10 are connected to a photoelectric converter 11, where light received by the light sensors 10 is converted into an electric signal corresponding to the intensity of light received. Each light sensor 10 may be formed of a great number of optical fibers arranged in the transverse direction (X-direction) of the manuscript 8, each optical fiber having one end facing the under surface of the manuscript 8 and the other end optically shielded and coupled by the photoelectric converter 11. The photoelectric converter 11 may be formed of a photomultiplier or photo diode. The photoelectric converter 11 is connected with a page memory circuit 13 through a binary circuit or Schmitt circuit 12, so that an output signal from the photoelectric converter 11 is converted into a digital signal by the binary circuit 12 and stored by the page memory circuit 13. The output side of the page memory circuit 13 is connected to the control side of the modulator 3 of the laser scanning system, and the modulator 3 modulates the incident laser beam in accordance with the digital signal from the page memory circuit 13 so that the mirror 5a of the scanner 5 may receive the laser beam intermittently. The page memory circuit 13 is connected with a mode selector switch 14 for the selection between reading and writing modes, whereby input and output to and from the page memory circuit 13 are controlled. The mode selector switch 14 is also connected to the rotary solenoid 7, and the solenoid 7 is driven by the operation of the switch 14 to achieve selective rocking of the rocking mirror 6 between the reading and writing positions.

Figure 2:
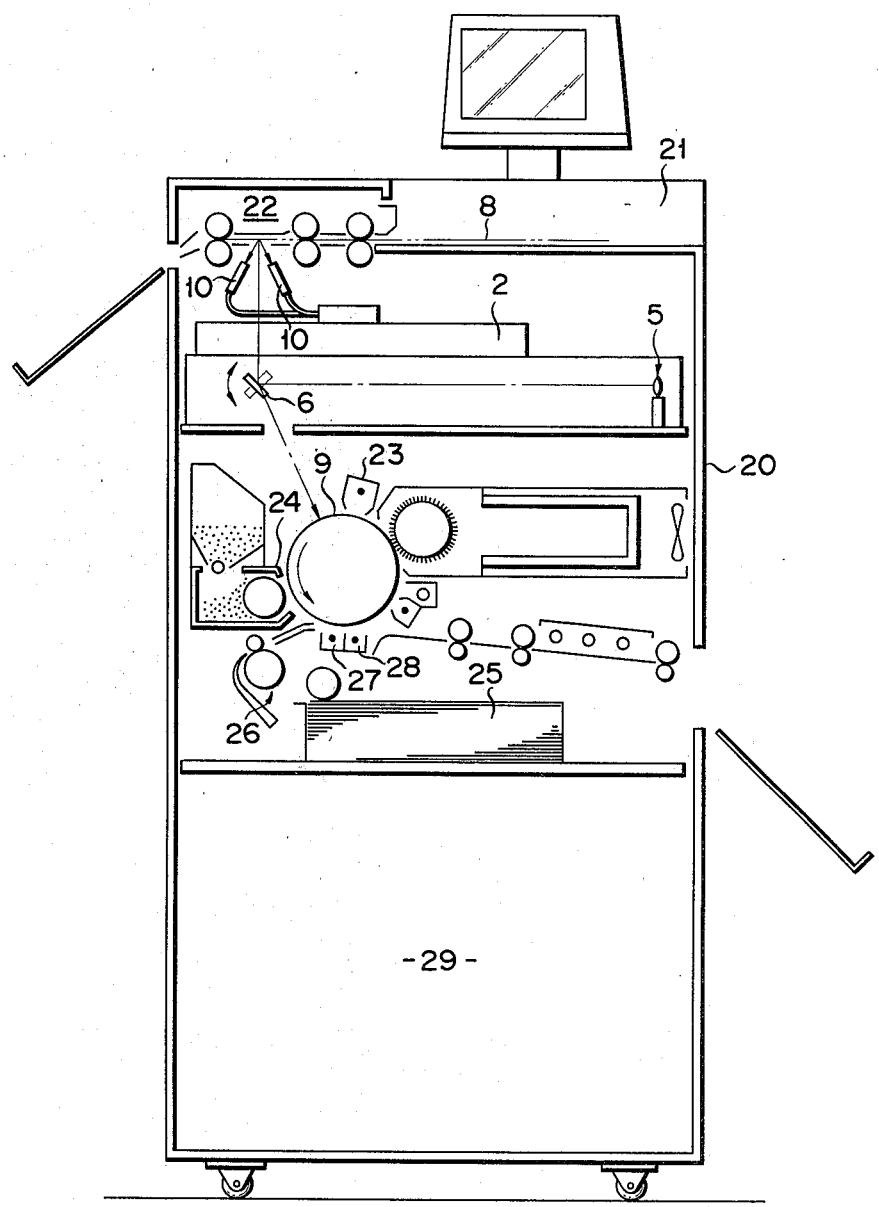
FIG. 2 is a schematic cross-sectional view of the electronic printing apparatus in its totality.

FIG. 2 shows a specific arrangement of an electronic printing apparatus incorporating the mechanism of FIG. 1. On the upper right-hand side within a housing 20 exists a supply section 21 from which the manuscript 8 is fed. On the left of the supply section 21 lies a feed mechanism 22 which is composed of a plurality of pairs of pinch rollers. While being carried in the Y-direction by the mechanism 22, the manuscript 8 is scanned by the reflected light from the rocking mirror 6, and the reflected light from the manuscript 8 is received by the light sensors 10. Below the feed mechanism 22 lies the laser oscillator 2. The laser beam oscillated by the laser oscillator 2 is led to the optical scanner 5 via the modulator and optical system (not shown), and reflected therefrom toward the rocking mirror 6.

As described above with reference to FIG. 1, when the rocking mirror 6 is in the writing position, the laser light incident upon the mirror 6 is reflected toward the photoconductive drum 9 to scan the photoconductive surface of the drum 9. Around the photoconductive drum 9, there are successively arranged, in the rotating direction of the drum 9, a charger 23 for charging the photoconductive surface in advance of exposure, a developer 24 to solarize an electrostatic latent image on the photoconductive surface by the use of toner, a feed mechanism 26 to supply copying paper 25 onto the photoconductive surface, a charger 27 for transcription to transfer a toner image on the photoconductive surface to the copying paper 25, and a charger 28 for exfoliation to strip the copying paper 25 off the photoconductive surface. Necessary electric circuits are contained in a space 29 at the lower portion of the housing 20.

Now there will be described the operation of the electronic printing apparatus of the above-mentioned construction.

When an operation button (not shown) is depressed with one or more manuscripts 8 set in the supply section 21 and with the mode selector switch 14 set for the reading mode, a laser beam is oscillated from the laser oscillator 2. At this time, the modulator 3 is not operated, and the laser beam is not modulated, and is let to the optical system 4 to be condensed, and reaches the optical scanner 5. The mirror portion 5a of the optical scanner 5 rotates and reflects the laser beam to change it into a linear scanning beam, and projects the scanning beam on the rocking mirror 6. By means of the rocking mirror 6, the manuscript 8 is scanned with the scanning beam in the X-direction. Since at that time the manuscript 8 is being carried in the Y-direction by the feed mechanism 22, the mansucript 8 can be scanned all over the surface. The light reflected from the manuscript 8 is received in the light sensor 10 as a reflected light corresponding to figures on the manuscript 8. Such optical signal is converted into an electric signal by the photoelectric converter 11, further converted into a digital signal by the Schmitt circuit 12, and stored in the page memory 13.

When the scanning of the whole surface of the manuscript 8 is completed, the mode selector switch 14 is set for the writing mode, the rocking mirror 6 is rocked to the writing position, and the modulator 3 is operated for modulation by means of the signal stored in the page memory circuit 13. Then, the laser beam from the oscillator 2 is modulated by the modulator 3, led to the rocking mirror 6 via the optical system 4 and optical scanner 5, and reflected by the mirror 6 toward the photoconductive surface side of the photoconductive drum 9, thereby exposing the photoconductive surface. Thereafter, copying operation is repeated for several sheets of copying paper 25 according to the rotation of the drum 9 in the same manner with a conventional electronic copying machine.

The above-mentioned printing apparatus may alternatively be so constructed that the end of scanning of each manuscript may be detected for automatic changeover to the writing mode without utilizing the mode selector switch. Moreover, the page memory may be so designed as to be able to store the contents of a number of manuscripts together, without being limited to those of a single manuscript.

As described above, the electronic printing apparatus according to this invention can perform both reading and writing operations as specified by the use of a single laser scanning system, thus enabling a substantial reduction in cost.

What is claimed is:

1. An electronic printing apparatus comprising:
a single laser oscillaor for emitting a laser beam;
a rocking mirror rockable between reading and writing positions;
optical means for conducting a laser beam from said laser oscillator to said rocking mirror;
means for positioning a manuscript having information thereon to be printed so that the manuscript is scanned with the laser beam reflected from said rocking mirror when said mirror is in said reading position;
photoelectric converter means for receiving light reflected from the manuscript and providing an electric signal corresponding to the intensity of the reflected light;
memory means for storing the electric signal;
modulator means operated by the electric signal read from the memory means and corresponding to information previously stored therein for modulating a laser beam emitted by the laser before it impinges on said rocking mirror;
photoconductive means for receiving the reflected light from said rocking mirror when said mirror is in said writing position; and
switch means for blocking the signal from said memory means to said modulator means when said rocking mirror is in said reading position and for conducting the signal from said memory means to said modulator means when said mirror is in said writing position.

2. An electronic printing apparatus according to claim 1, wherein said optical means includes an optical scanner reflecting the laser beam from said laser oscillator and linearly scanning said rocking mirror with the reflected laser beam.

3. An electronic printing apparatus according to claim 2, wherein said manuscript positioning means includes a feed mechanism for moving the manuscript in a direction at right angles to the scanning direction of the laser beam.

4. An electronic printing apparatus according to claim 1, wherein said optical means includes an optical system to converge the laser beam from said laser oscillator and a scanning mirror to reflect laser beam from said optical system for linearly scanning said rocking mirror, and wherein said modulator means includes a modulator located between said laser oscillator and said optical system for modulation of the laser beam from said laser oscillator.

5. An electronic printing apparatus according to claim 4, wherein said laser oscillator includes an argon gas laser source.

6. An electronic printing apparatus according to claim 4, wherein said photoelectric converter means includes a light sensor to receive reflected light from the manuscript and a photoelectric converter to convert light from said light sensor into an electric signal.

7. An electronic printing apparatus according to claim 6, wherein said light sensor includes a plurality of optical fibers arranged along the scanning direction of the laser beam, each said optical fiber having one end facing the manuscript and the other connected to said photoelectric converter.

8. An electronic printing apparatus according to claim 1, wherein said memory means is a page memory circuit for storing the contents of one or more manuscripts.